May 23, 1939.                W. C. McBAIN                2,159,337
                              ROLL BEARING
                         Filed Oct. 15, 1936        3 Sheets-Sheet 1

INVENTOR
William C. McBain
by his attorneys
Stebbins, Blenko & Parmelee

May 23, 1939.   W. C. McBAIN   2,159,337
ROLL BEARING
Filed Oct. 15, 1936   3 Sheets-Sheet 2

INVENTOR
William C. McBain
by his attorneys
Stebbins Blenko & Parmelee

Patented May 23, 1939

2,159,337

UNITED STATES PATENT OFFICE 2,159,337

ROLL BEARING

William C. McBain, Youngstown, Ohio

Application October 15, 1936, Serial No. 105,723

9 Claims. (Cl. 80—55)

This invention relates to roll bearings and, in particular, to bearings for the work rolls of four-high rolling mills.

The work rolls of such mills have to be changed frequently because of surface wear. The roll bearings, furthermore, require continuous lubrication. It was necesary, with the bearings previously used, to connect and disconnect the lubricant supply to each bearing when changing rolls. It was also necessary to line up the work rolls and their bearings accurately after each change. The bearings used previously, furthermore, permitted the entry of dirt, water and other foreign matter which have an injurious effect upon the bearings.

It is an object of my invention, therefore, to improve upon the work roll bearings which have been used heretofore, and to provide bearings such that the rolls and their bearings can be quickly changed, without the necessity of making and breaking connections for lubricant supply. Other novel features and advantages of the invention will become apparent as the detailed description thereof proceeds, and will be specifically pointed out in the appended claims.

In accordance with my invention, I provide a recess in the chocks in which the backing rolls of the mill are journaled for receiving the work roll bearings. Each work roll bearing comprises a pair of arcuate-faced members adapted to be disposed on oposite sides of the neck of the roll and connected by a tie plate secured to both of them. Wear plates are secured to the bearing members and to the walls of the recess in which the bearing is mounted. By this means, a close fit between the parts is obtained. Passages for lubricating fluid extend through the walls of the recess and the bearing members themselves, ana I provide means for sealing the joint between the parts whereby the rolls with their bearings may be removed and replaced without breaking or making any lubricant-supply connections, communication between the passages being established automatically when they are alined. I also provide thrust bearings for engaging ends of the roll necks.

A present preferred embodiment of the invention, with certain modifications thereof, is illustrated in the accompanying drawings in which, Fig. 1 is a view partly in side elevation and partly in section showing the mounting of the work roll bearings in the chocks in which the backing rolls are journaled;

Figure 1:
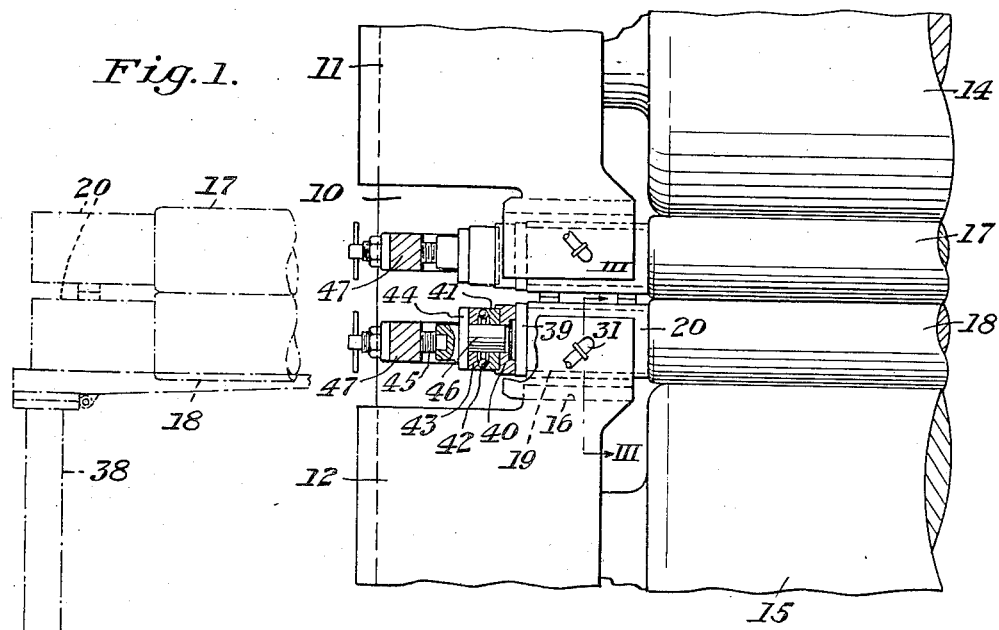

A four-high mill comprises housings, a portion of one of which is shown at 10, having bearing chocks 11 and 12 slidable in housing windows 13, and backing rolls 14 and 15 journaled in the chocks 11 and 12. Recesses 16 are formed in the lower face of the chock 11 and the upper face of the chock 12 for receiving bearings for the work rolls 17 and 18. As the bearings at each end of both work rolls are similar, a detailed description of one of them will suffice for all.

Figure 3:
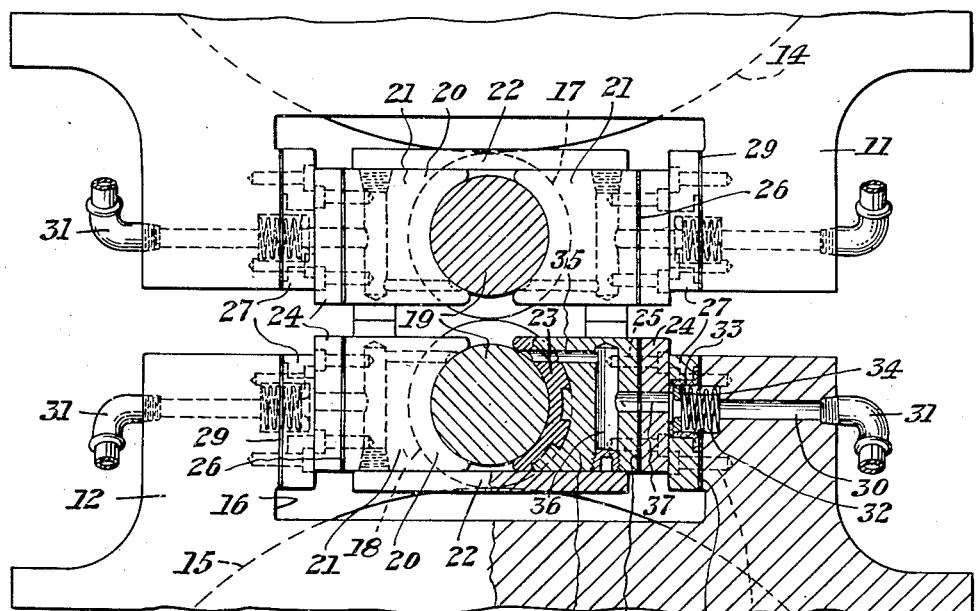
Fig. 3 is a view partly in end elevation and partly in section along the line III—III of Fig. 1 to a somewhat larger scale.

Referring now for the moment particularly to Fig. 3, the work roll 18 has a neck 19 journaled in a bearing 20. The bearing 20 comprises a pair of arcuate-faced members 21 disposed on opposite sides of the neck 19 and connected by a tie plate 22 secured by any convenient means to the members 21. The latter may be lined with babbitt or other bearing material, as indicated at 23. Wear plates 24 are secured to the members 21 as by screws 25, shims 26 being inserted between the plates 24 and the members 21 to maintain a predetermined overall width of the bearing. The sides of the recess 16 in the upper face of the chock 12 are similarly provided with wear plates 27 secured to the chock by screws 28. Shims 29 are inserted between the wear plates 27 and the sides of the recess 16 to maintain a predetermined spacing between adjacent faces of the plates 27 to correspond with the width of the roll bearing between outside faces of the plates 24.

A passage 30 in the chock has a connection 31 to a lubricant supply. The passage 30 opens into a bore 32 formed partly in the chock 12 and partly in the plate 27. A cup washer 33 of leather or metal has its outer edge clamped between the plate 27 and the side wall of the recess 16 and its inner edge adjacent the plate 24. A spring-pressed washer 34 urges the inner edge of the cup washer against the plate 24 to seal the annular joint between the plates 24 and 27, preventing the escape of lubricant therethrough.

Each bearing member is bored as at 35 and 36. A bore 37 through the plate 24 and into the member 21 provides a passage for lubricant supplied through the connection 31 to the roll neck 19.

When it is necessary to change the work rolls, the roll bearings, each including the bearing members 21 proper, the tie plate 22, and the wear plates 24, slide out of the recess or space between the plates 27 on axial movement of the rolls. The supply of lubricant to the bearings is cut off before changing rolls. When the new set of rolls is inserted, its bearings fit accurately between the plates 27, and the connection for lubricant supply is re-established as soon as the bore 37 is in alinement with the bore 32. Since the latter is somewhat larger than the former, exact alinement is not necessary and free communication is maintained regardless of slight differences in the sizes of the work rolls which cause the bearings to be disposed at slightly different levels. A removable skid frame 38 is set up adjacent the mill to support the work rolls as they are removed from and inserted into the mill.

Figure 2:
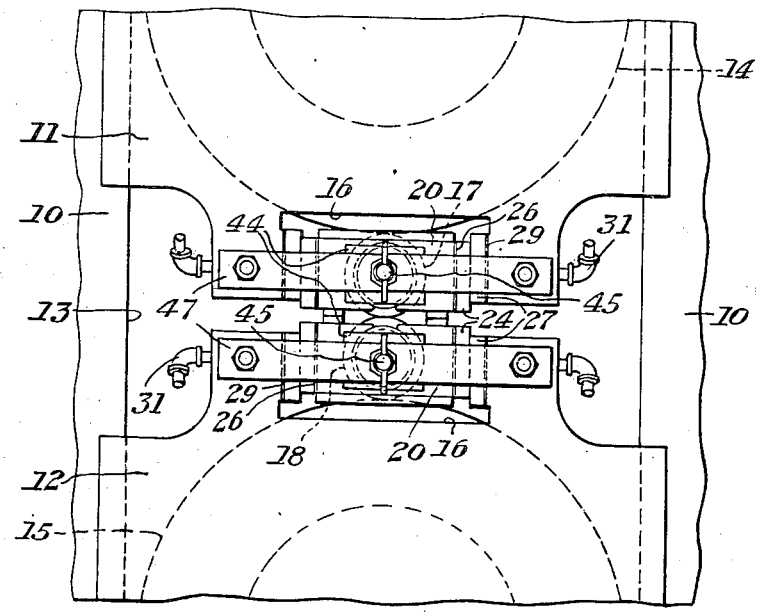
Fig. 2 is an end view of the parts shown in Fig. 1.

Referring now particularly to Figs. 1 and 2, the roll neck 19 is provided with an end collar 39 having a cup 40 held adjacent thereto for receiving the rotating race 41 of a ball thrust bearing 42. The bearing has a fixed race 43 backed up by a collar 44 carried on the end of an adjusting screw 45. The collar 44 has a stud 46 extending through the bearing. The screw 45 is threaded through a bracket bar 47 which is bolted to the chock 12 and extends across the recess in same. The bearing 42 and a similar bearing mounted on the opposite end of the roll 18, prevent axial shifting of the roll. The bearing 42 is removed, of course, by taking down the bar 47, before changing rolls.

Figure 4:
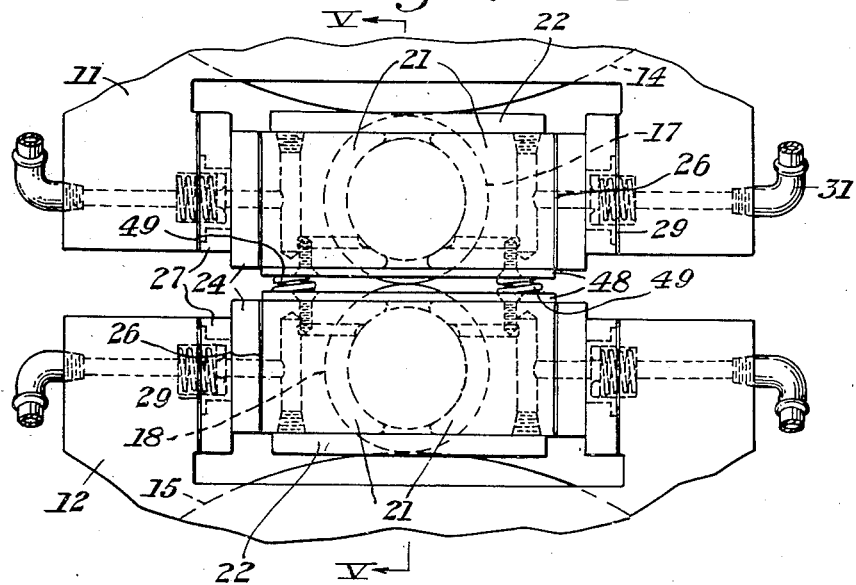
Fig. 4 is a view similar to Fig. 3 showing a modification.

Fig. 4 illustrates a bearing similar to that of Figs. 1 through 3, except that it is a fully enclosed bearing having a cover plate 48 extending between the bearing members 21 and secured thereto. This prevents the access of dirt, water and other foreign matter to the bearing surfaces. This form of the invention is particularly useful in cases where the fluid applied to the strip during rolling is injurious to the bearings. The springs 49 serve to carry the weight of the upper work roll assembly and hold the upper work roll against the upper back-up roll.

Figure 5:
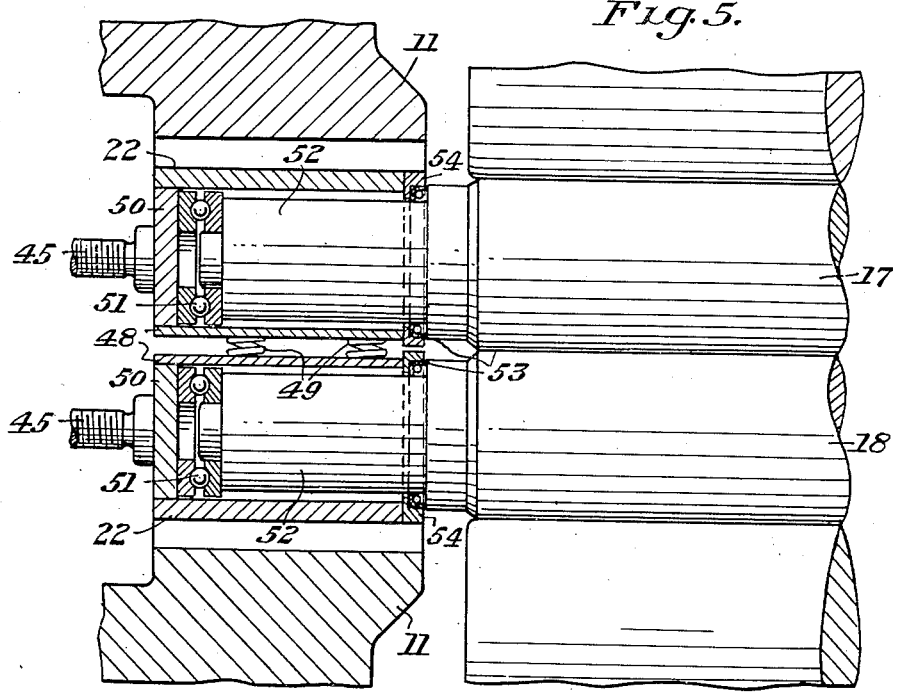
Fig. 5 is a sectional view along the line V—V of Fig. 4.

A plate 50 forms an end wall for the bearing box, as shown in Fig. 5, and a thrust bearing 51 is disposed between it and the end of the roll neck shown at 52. Screws 45 prevent axial shifting of the rolls 17 and 18. Oil seals 53 close the joints between the inner end wall 54 on the bearing box and the roll necks 52.

Figure 6:
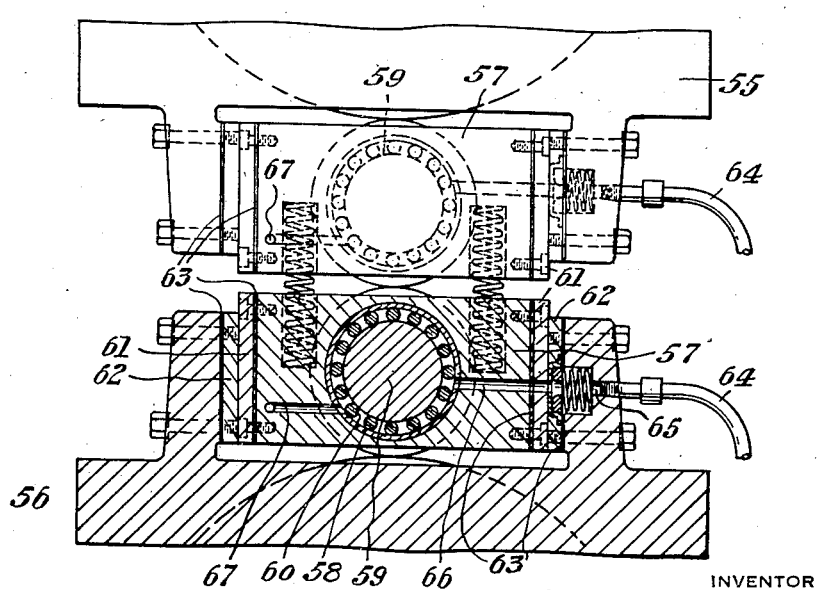
Fig. 6 is a view showing a still further modification.

Fig. 6 illustrates a modification of the invention which is adapted for the use of roller bearings on the necks of the work rolls. In Fig. 6 the chocks in which the backing rolls are journaled are indicated at 55 and 56. Each work roll bearing comprises a block 57 bored to receive a race 58. The roll neck shown at 59 is supported on roller bearings 60 traversing the race 58. The block 57 has wear plates 61 removably secured thereto, and similar plates 62 are secured to the wall of the recess in the chock in which the bearing block is positioned. Shims 63 between the plates 61 and the block 57, and between the plates 62 and the chock 56, provide a close fit of the bearing in the chock. A lubricant-supply connection 64 and passages 65 and 66 in the chock and bearing block similar to those already described provide for the admission of lubricant to the bearing. To prevent excess lubricant being delivered to the bearing, an overflow passage 67 is provided.

It will be apparent from the foregoing description that the invention greatly facilitates the quick changing of the work rolls and their bearings. It also provides for lubricating bearings and eliminates the breaking and making of lubricating connections when changing rolls, this being automatically taken care of by removal and replacement of the bearings. The close fit between the bearing assembly and the recesses designed to receive them insures accurate lining up of the work rolls and their bearings without necessitating special precautions or adjustments. The overall widths of all interchangeable bearing assemblies are the same, so that it is unnecessary to make any adjustments when changing rolls. The bearings are either partly or wholly enclosed to prevent access of foreign matter and the deleterious effect on the bearings caused thereby.

Although I have stated that identical bearings may be used on both ends of the work rolls, the invention is not limited in its application to mills through which the material is pulled, and suitable modification of the bearings may be made to provide a driving connection at one end of the work rolls, if desired.

Although I have illustrated and described herein but one preferred embodiment and a few modifications of the invention, it will be understood that changes in the construction described may be made without departing from the spirit of the invention or the scope of the appended claims.

I claim:

1. The combination with a rolling mill having backing rolls journaled in bearing chocks, said chocks having recesses therein, of work roll bearings seated in said recesses, said bearings having a close fit in said recesses but being freely movable therefrom with the work roll on axial movement of the latter, passages in said chocks and bearings adapted to be alined when the bearings are properly positioned in the chocks, and means for sealing the joints between the passages in the chocks and the passages in the bearings.

2. A bearing for the work roll of a mill having a backing roll journaled in chocks, said bearing comprising a pair of arcuate-faced members adapted to engage a neck of the work roll on opposite sides thereof, said members being disposed in a recess in the backing roll chocks, hardened wear plates on said members, and similar plates in said recess engaged by said first-mentioned plates and making a close, sliding fit therewith, whereby to facilitate removal of the bearings from the recess on axial movement of the roll.

3. A bearing for the work roll of a mill having a backing roll journaled in chocks, said bearing comprising a pair of arcuate-faced members adapted to enagage a neck of the work roll on opposite sides thereof, said members being disposed in a recess in the backing roll chocks, hardened wear plates on said members, similar plates in said recess engaged by said first-mentioned plates and making a close, sliding fit therewith, whereby to facilitate removal of the bearings from the recess on axial movement of the roll, and communicating passages extending through said chocks, bearing members and wear plates.

4. A bearing for the work roll of a mill having a backing roll journaled in chocks, said bearing comprising a pair of arcuate-faced members adapted to engage a neck of the work roll on opposite sides thereof, said members being disposed in a recess in the backing roll chocks, and a tie plate secured to both said members and effective to maintain them in spaced relation.

5. A bearing for the work roll of a mill having a backing roll journaled in chocks, said bearing comprising a pair of arcuate-faced members adapted to engage a neck of the work roll on opposite sides thereof, said members being disposed in a recess in the backing roll chocks, hardened wear plates on said members, similar plates in said recess engaged by said first-mentioned plates and making a close, sliding fit therewith, whereby to facilitate removal of the bearings from the recess on axial movement of the roll, communicating passages extending through said chocks, bearing members and wear plates, and sealing means surrounding the passages adjacent the plane of separation between the wear plates on the chock and those on the bearings.

6. A bearing for the work roll of a mill having a backing roll journaled in chocks, said bearing comprising a pair of arcuate-faced members adapted to engage a neck of the work roll on opposite sides thereof, said members being disposed in a recess in the backing roll chocks, a tie plate extending between and secured to the bearing members on one side of the roll neck and a cover plate on the other.

7. A bearing for the work roll of a mill having a backing roll journaled in chocks, said bearing comprising a pair of arcuate-faced members adapted to engage a neck of the work roll on opposite sides thereof, said members being disposed in a recess in the backing roll chocks, a tie plate extending between and secured to the bearing members on one side of the roll neck and a cover plate on the other, an end plate extending between the tie plate and cover plate, and a thrust bearing between the end plate and the end of the roll neck.

8. The combination with backing rolls journaled in movable chocks, work rolls journaled in bearings movably mounted in said chocks, wearing plates on said bearings and chocks having sliding engagement with each other, and fluid supply connections extending through said chocks and bearings, said connections including passages through said plates thereby permitting ready breakage and re-establishment of said connections.

9. The combination with backing rolls journaled in movable chocks, work rolls journaled in bearings movably mounted in said chocks, of lubricant supply passages extending through said chocks and bearings to the faces of said bearings, and relatively slidable plates between the bearings and chocks, said plates having holes in alinement with said passages, whereby said connections are automatically broken and re-established as the work roll and its bearings are removed and replaced respectively.

WILLIAM C. McBAIN.